United States Patent Office 2,975,195
Patented Mar. 14, 1961

2,975,195
NEW HYDROAROMATIC DI- AND POLY-AMIDES

Hans Batzer, Arlesheim, and Erwin Nikles, Basel, Switzerland, assignors to Ciba Limited, Basel, Switzerland, a Swiss firm No Drawing. Filed July 22, 1959, Ser. No. 828,727

Claims priority, application Switzerland Aug. 5, 1958

2 Claims. (Cl. 260—348)

This invention provides hydroaromatic di- and poly-amides of the general formula

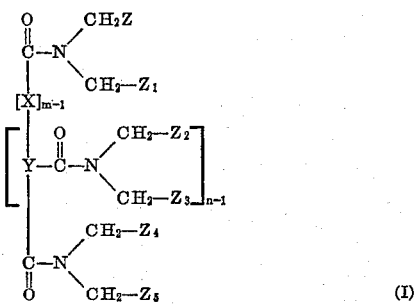

in which X represents a divalent organic radical such as an aliphatic, cycloaliphatic, araliphatic, aromatic or heterocyclic radical, which may be interrupted by functional groups or heteroatoms, Y represents such a trivalent organic radical, $m$ is the whole number 1 or 2, $n$ is a whole number, and Z, $Z_1$, $Z_2$, $Z_3$, $Z_4$ and $Z_5$ each represent a radical of the formula

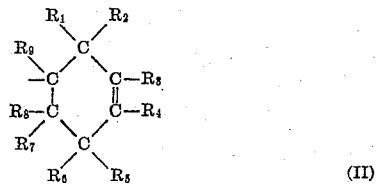

in which $R_1$, $R_2$, $R_3$, $R_4$, $R_5$, $R_6$, $R_7$, $R_8$, $R_9$ each represent a hydrogen atom or a monovalent substituent, such as a halogen atom or an aliphatic, cycloaliphatic, araliphatic or aromatic hydrocarbon radical, and $R_1$ and $R_5$ may together represent a divalent substituent, such as a methylene group.

The invention also provides a process for the manufacture of the aforesaid new amides, wherein a secondary amine of the formula

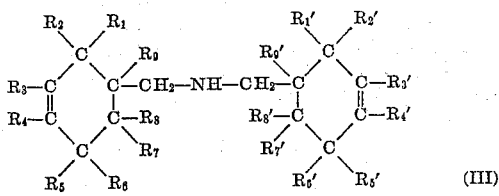

in which $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$ and $R_9'$ each represent a halogen atom or a monovalent substituent such as a halogen atom or an aliphatic, cycloaliphatic, araliphatic or aromatic hydrocarbon radical, and $R_1$ and $R_5$ and/or $R_1'$ and $R_5'$ may together represent a divalent substituent, such as a methylene group, or a mixture of two or more such secondary amines, is condensed with a di- or poly-carboxylic acid or functional derivative thereof, more especially a di- or poly-carboxylic acid halide.

When there is used as starting material a symmetrical secondary amine of the formula

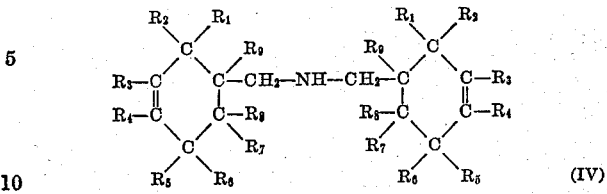

di- or poly-amides are obtained, in which all the radicals Z, $Z_1$, $Z_2$, $Z_3$, $Z_4$ and $Z_5$ are identical with one another or correspond to the general formula

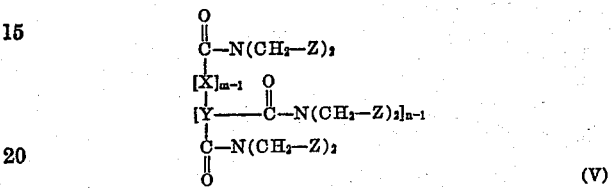

Especially easily obtainable are diamides of the formula

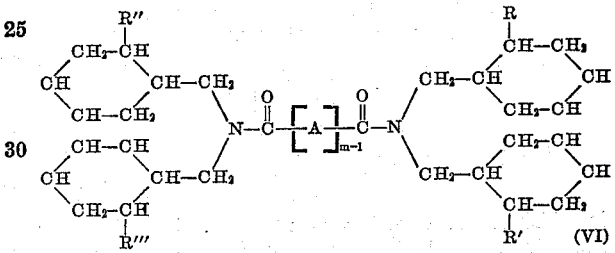

in which R, R', R" and R''' each represent a hydrogen atom or lower alkyl radical containing 1 to 4 carbon atoms, A represents an alkylene radical or a phenylene radical, and $m$ is the whole number 1 or 2.

Among the amines of the Formulae III and IV used as starting materials there may be mentioned di-$\Delta^3$-tetrahydrobenzylamine and bis-(6-methyl-$\Delta^3$-tetrahydrobenzyl)-amine which can easily be obtained, for example, by condensing 1 mol of $\Delta^3$-tetrahydrobenzylamine or 6-methyl-$\Delta^3$-tetrahydrobenzylamine with 1 mol of $\Delta^3$-tetrahydrobenzaldehyde or 6-methyl-$\Delta^3$-tetrahydrobenzaldehyde to form the Schiff's base, and then hydrogenating the latter to form the secondary amine under conditions such as to avoid saturating the —C=C— double bonds in the cyclohexene ring, for example, by means of a sodium alcoholate or lithium-aluminium hydride.

As di- and poly-carboxylic acids or functional derivatives thereof, such as acid halides, anhydride, esters or amides, from which the di- or poly-amides of the invention are derived, those of the aliphatic, cycloaliphatic, araliphatic, aromatic and heterocyclic series may be used.

In the aliphatic series there may be mentioned: Malonic acid, succinic acid, glutaric acid, adipic acid, pimelic acid, suberic acid, azelaic acid, sebacic acid and especially oxalic acid; tricarballylic acid, maleic acid, fumaric acid, itaconic acid, acetylene-dicarboxylic acid, aconitic acid, malic acid, tartaric acid, mucic acid and citric aid; dimerized or trimerized unsaturated fatty acids, such as dimerized or trimerized linoleic acid; polymers or copolymers containing carboxyl groups, such as polyacrylic acid or polymethacrylic acid, and also partially hydrolyzed polymers or copolymers of esters of methacrylic acid or of acrylic acid, such as acrylic acid methyl ester or acrylic acid ethyl ester.

In the cycloaliphatic series there may be mentioned hexahydrophthalic acid and hexahydroterephthalic acid.

In the araliphatic series there may be mentioned homophthalic acid and ortho-phenylene-diacetic acid.

In the aromatic series there may be mentioned phthalic acid, isophthalic acid, terephthalic acid, diphenic acid, pyromellitic acid, mellitic acid, naphthalene-1:8-dicarboxylic acid, 1:1-dinaphthyl-8:8'-dicarboxylic acid, naphthalene - 1:4:5:8 - tetracarboxylic acid and perylene-3:4:9:10-tetracarboxylic acid.

In the heterocyclic series there may be mentioned 2:3-pyridine dicarboxylic acid (quinolinic acid) and 2:3-quinoline dicarboxylic acid (acridinic acid).

The manufacture of the new di- and poly-amides may be carried out by methods in themselves known, for example, by condensing the secondary amine with the di- or polycarboxylic acid chloride in the presence of an acid binding agent such as pyridine.

The new diamides and polyamides of the general Formula I are valuable intermediate products, which can be used for the manufacture of textile assistants, plastics, plasticizers, stabilizers for chlorinated polyvinyl compounds and the like. By epoxidation of the —C=C— double bonds in the cyclohexene rings by the usual methods, for example, by means of peracetic acid or perbenzoic acid, there are obtained diepoxy-compounds of the formula

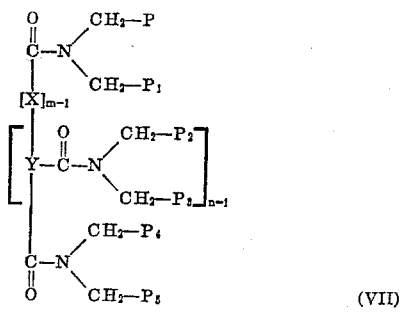

(VII)

in which X, Y, m and n have the meanings given for Formula I, and P, $P_1$, $P_2$, $P_3$, $P_4$ and $P_5$ each represent a radical of the formula

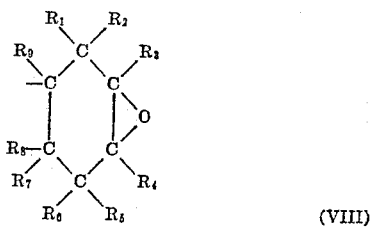

(VIII)

in which $R_1$, $R_2$, $R_3$, $R_4$, $R_5$, $R_6$, $R_7$, $R_8$, $R_9$, have the meanings given for Formula II.

Especially easily obtainable are the tetraepoxidated diamines of the formula

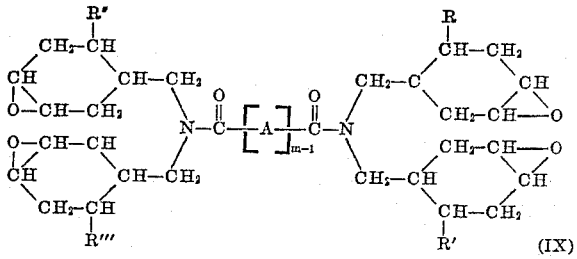

(IX)

in which R, R', R", R''', A and m have the meanings given for Formula VI.

The epoxidated di- or poly-amides of this invention react with the usual hardeners for epoxy-compounds. They can therefore be cross-linked or completely hardened by the addition of such hardeners in a manner analogous to that of other polyfunctional epoxy-compounds or epoxy resins. As such hardeners there may be used basic or preferably acid compounds. As such compounds there may be mentioned amines or amides, such as aliphatic or aromatic primary, secondary or tertiary amines, for example, mono-, di- or tri-butyl-amine, para-phenylene diamine, ethylene diamine, N:N-diethyl-ethylene diamine, diethylene triamine, triethylene tetramine, tetraethylene pentamine, trimethylamine, diethylamine, triethanolamine, Mannich bases, pyridine, piperazine, guanidine or guanidine derivatives, such as phenyl-diguanidine, diphenyl-guanidine, dicyandiamide, aniline-formaldehyde resins, urea-formaldehyde resins, melamine formaldehyde resins; or polymers of aminostyrenes, polyamides, for example, those of aliphatic polyamines with dimerized or trimerized unsaturated fatty acids, isocyanates or isothiocyanates; polyhydric phenols, for example, resorcinol hydroquinone, quinone, phenol-aldehyde resins, oil-modified phenol aldehyde resins, reaction products of aluminium alcoholates or phenolates with tautomerically reacting compounds of the type of an acetoacetic acid ester, Friedel-Crafts catalysts, for example, aluminium trichloride, antimony penta chloride, tin tetrachloride, ferric chloride, zinc chloride, or boron trifluoride, and their complexes with organic compounds; phosphoric acid. It is preferable to use as hardeners polybasic carboxylic acids and anhydrides thereof, for example, phthalic anhydride, methyl-endomethylene-tetrahydrophthalic anhydride, dodecenyl-succinic anhydride, hexahydrophthalic anhydride, hexachloro-endomethylene-tetrahydrophthalic anhydride or endomethylene-tetrahydrophthalic anhydride or mixtures thereof. Maleic anhydride or succinic anhydride, and, if desired, an accelerator such as a tertiary amine, may be added. The expression "hardened" is used herein to mean the conversion of the aforesaid epoxy-compounds into insoluble and infusible resins.

There may be incorporated with the hardenable epoxidated diamides or polyamides, or mixtures thereof with hardeners, at any stage before the hardening operation a filling material, plasticizer, colouring matter etc.

As extenders and fillers there may be used, for example, glass fibers, mica, quartz meal, cellulose, kaolin, finely divided silicic acid (aerosil) or metal powders.

The mixtures of epoxidated diamides or polyamides and hardeners can be used in the non-filled or filled condition either in solution or emulsion as textile assistants, laminating resins, lacquers, paints, immersion resins, casting resins, spreading-, filling- or putty like masses, adhesives or the like, or for the production of such preparations.

The following examples illustrate the invention, the parts and percentages being by weight unless otherwise stated, and the relationship of parts by weight to parts by volume being the same as that of the kilogram to the liter:

EXAMPLE 1

$N:N:N':N'$ - tetra ($\Delta^3$ - tetrahydrobenzyl) - oxamide 51 parts of di-$\Delta^3$-tetrahydrobenzylamine were mixed with 200 parts by volume of ethylene chloride and 25 parts of pyridine that had been dried over potassium hydroxide. 16 parts of oxalyl chloride were added dropwise to the solution in the course of 23 minutes at 4–9° C., while stirring well, whereupon a solid precipitate was formed. After allowing the mixture to stand for several hours at room temperature it was mixed with 200 parts by volume of 2 N-hydrochloric acid, while cooling with ice. The hydrochloric acid was separated and the organic layer was washed with 200 parts by volume each of 2 N-hydrochloric acid, a 2 N-solution of sodium carbonate, and water. After drying the solution over sodium sulfate the solvent was distilled off. The residue, 56 parts, soon solidified. By after crystallization from methanol the resulting N:N:N':N'-tetra-($\Delta^3$-tetrahydrobenzyl)-oxamide melted at 111–113° C., and had the analysis:

$C_3OH_{44}O_2N_2$—Calculated: C, 77.54; H, 9.54; N, 6.03%. Found: C, 77.40; H, 9.52; N, 6.05%.

EXAMPLE 2

*Epoxidation of N:N:N':N'-tetra-(Δ³-tetrahydrobenzyl)-oxamide*

23 parts of N:N:N':N'-tetra-Δ³-tetrahydrobenzyl)-oxamide were dissolved in 200 parts by volume of benzene. 5 grams of pulverized anhydrous sodium acetate were added to the solution, and then 55 parts of peracetic acid of 38% strength were added dropwise at 30° C. in the course of 25 minutes, during which a second phase formed. After carrying on the reaction for 1½ hours at 30° C. and a further 3½ hours at 25° C. 87% of the theoretical amount of peracetic acid had been consumed. The lower aqueous layer was then separated. The benzene solution of the epoxide was washed with the addition of ice twice with 50 parts by volume of water on each occasion and then with a 2 N-solution of sodium carbonate and with water, then dried over sodium sulfate, and evaporated. The residue (22 parts) solidified to a hard mass.

In order to determine the epoxide content a test portion of 1.72 parts of the product was dissolved in 30 parts by volume of n-propanol, 5 ml. of a saturated aqueous solution of potassium iodide were added, and the whole was titrated at the boil against Bromophenol Blue with 1 N-hydrochloric acid until the yellow coloration persisted. 9.40 ml. of 1 N-hydrochloric acid were consumed (72% of theory).

The tetraepoxide so obtained can be hardened to a casting in the following manner:

3.66 parts of the epoxide resin described above were mixed in the molten state with 3.02 parts of methyl-endomethylene tetrahydrophthalic anhydride, and the mixture, after the addition of 1% of bis-(Δ³-tetrahydrobenzyl)-methyl amine as accelerator, was added in a cast form made of aluminium foils. By heating the casting for 1¼ hours at 150° C. it is hardened.

What is claimed is:

1. A compound of the general formula

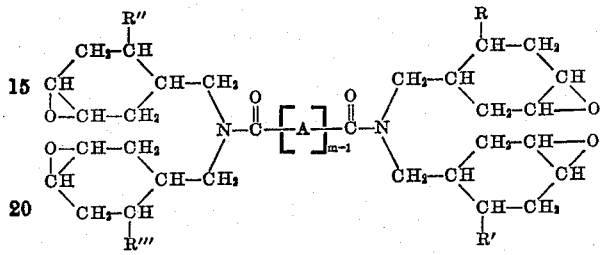

in which R, R', R" and R''' are members selected from the group consisting of a hydrogen atom and an unsubstituted lower alkyl radical of 1 to 4 carbon atoms, A represents an alkylene radical up to and including 8 carbon atoms, and *m* represents the whole number of at least one and at most two.

2. The compound of the formula

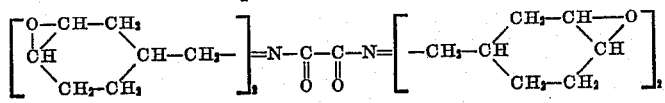

No references cited.